United States Patent [19]

Ng

[11] Patent Number: 5,316,192
[45] Date of Patent: May 31, 1994

[54] APPARATUS FOR PAIRWISE TRANSPORT OF ELONGATE OBJECTS

[75] Inventor: Daniel Ng, Mt. Vernon, N.Y.

[73] Assignee: Industri AB Thule, Sweden

[21] Appl. No.: 916,152

[22] PCT Filed: Jan. 25, 1991

[86] PCT No.: PCT/SE91/00056
§ 371 Date: Jul. 31, 1992
§ 102(e) Date: Jul. 31, 1992

[87] PCT Pub. No.: WO91/11344
PCT Pub. Date: Aug. 8, 1991

[30] Foreign Application Priority Data

Feb. 1, 1990 [SE] Sweden ................................ 9000349

[51] Int. Cl.$^5$ ................................................ B60R 9/00
[52] U.S. Cl. ...................................... 224/324; 224/917
[58] Field of Search ............... 224/324, 917, 315, 319, 224/323, 309; 211/70.5

[56] References Cited

U.S. PATENT DOCUMENTS

| 2,718,370 | 9/1955 | Carrier, Jr. | 224/317 |
| 2,782,973 | 2/1957 | Lang | 224/323 |
| 4,817,838 | 4/1989 | Kamaya | 224/917 |

FOREIGN PATENT DOCUMENTS

| 2040962 | 2/1972 | Fed. Rep. of Germany . |
| 2830676 | 8/1983 | Fed. Rep. of Germany . |
| 3344611 | 6/1985 | Fed. Rep. of Germany . |
| 3539288 | 5/1987 | Fed. Rep. of Germany . |
| 3262748 | 11/1991 | Japan | 224/917 |
| 401344 | 5/1978 | Sweden . |

Primary Examiner—Linda J. Sholl
Attorney, Agent, or Firm—Burns, Doane, Swecker & Mathis

[57] ABSTRACT

A transport apparatus for elongate objects, primarily so-called snow-boards or monoskis, is provided with a load strut which extends transversely across a vehicle roof and is secured in the side edges thereof. The load strut has a holder device with at least one accommodation space for objects, with the longitudinal direction of the space in the direction of travel of the vehicle and with the lateral direction of the space inclining in relation to the vertical. In order to provide reliable retention and superior transport capacity without the risk of projecting parts of the objects coming into contact with the vehicle roof, the holder device is provided with a rigid anchorage arrangement which, with a lower portion, straddles and is secured on the strut. The holder device is further provided with three fingers inclining in relation to the vertical and obliquely upwardly directed, the fingers being provided with soft gripping members which define the accommodation spaces. The holder device is also provided with a strap which retains the objects in the accommodation spaces and is secured in the two outermost fingers, in one of these by means of an adjustable fastener.

10 Claims, 3 Drawing Sheets

APPARATUS FOR PAIRWISE TRANSPORT OF ELONGATE OBJECTS

TECHNICAL FIELD

The present invention relates to an apparatus which is intended for the pairwise transport of elongate, panel-shaped objects, preferably so-called snow-boards or mono-skis. The apparatus comprises a strut extending transversely across a vehicle roof and secured in side edge portions of the vehicle roof, the strut being provided with a holder device which holds the objects in at least one accommodation space, with the longitudinal direction in the direction of travel of the vehicle and the lateral direction inclining in relation to the vertical.

BACKGROUND ART

A plurality of different types of holders intended for the transport of skis are previously known in this Art. Such prior Art ski-racks or ski-holders also include such apparatuses in which the skis lie in the longitudinal direction of the vehicle and with the lateral direction of the skis inclining in relation to a vertical line.

For example, DE 2 830 676 discloses a ski-holder in which the skis have the above-mentioned orientation. The holder according to this publication is complex and expensive to manufacture, circumstantial to use and designed in such a way that, in the transport of large and heavy objects, it must be considered as of doubtful reliability in terms of mechanical strength.

PROBLEM STRUCTURE

The present invention has for its object to realise an apparatus for the transport of elongate, panel-shaped objects, primarily quite wide such objects, according to which the apparatus may be manufactured in a simple and economical manner which is nevertheless satisfactory from the viewpoint of mechanical strength. The present invention further has for its object to realise an apparatus which possesses good transport capacity so that a plurality of objects may be transported on one and the same vehicle. The present invention further has for its object to realise an apparatus which permits transport, without any risk that parts projecting from the objects, such as bindings, will come into contact with the vehicle roof. Finally, the present invention further has for its object to realise an apparatus in which loading and unloading of the objects may readily be effected even on very tall vehicles.

SOLUTION

The objects forming the basis of the present invention will be attained if the apparatus intimated by way of introduction is characterised in that the holder is provided with a substantially rigid anchorage portion with at least two, preferably three approximately parallel fingers which incline in relation to the vertical; that there are provided, at least projecting outside the mutually facing surfaces of the fingers, gripping members of resiliently yieldable material; and that the holder further includes devices engaging with the objects and disposed to prevent displacement of the objects in the longitudinal direction of the fingers.

According to a first embodiment of the present invention, the anchorage portion is suitably formed from two outer portions which are in spaced-apart relationship and are manufactured from panel-shaped material, these portions being rigidly interconnected via connection devices extending between these outer portions, and the gripping members are provided with parts which are disposed between the outer portions.

This embodiment is also suitably characterised in that the gripping members are provided as a continuous intermediate section of approximately the same configuration as the anchorage portion, the fingers of the intermediate section being wider than the fingers of the anchorage portion.

In one variation of this embodiment, it further suitably applies according to the present invention that the gripping members are provided in the form of a strap which extends about the connection devices and is held by these in a position where it follows at least along the contour of the fingers.

A second embodiment of the present invention is suitably characterised in that the anchorage portion is produced as a substantially solid portion manufactured, for example, of plastic; and that the gripping members are applied exteriorly on this portion.

BRIEF DESCRIPTION OF THE ACCOMPANYING DRAWINGS

The present invention will now be described in greater detail hereinbelow, reference being had to the accompanying Drawings. In the accompanying Drawings.

DESCRIPTION OF PREFERRED EMBODIMENT

Figure 1:
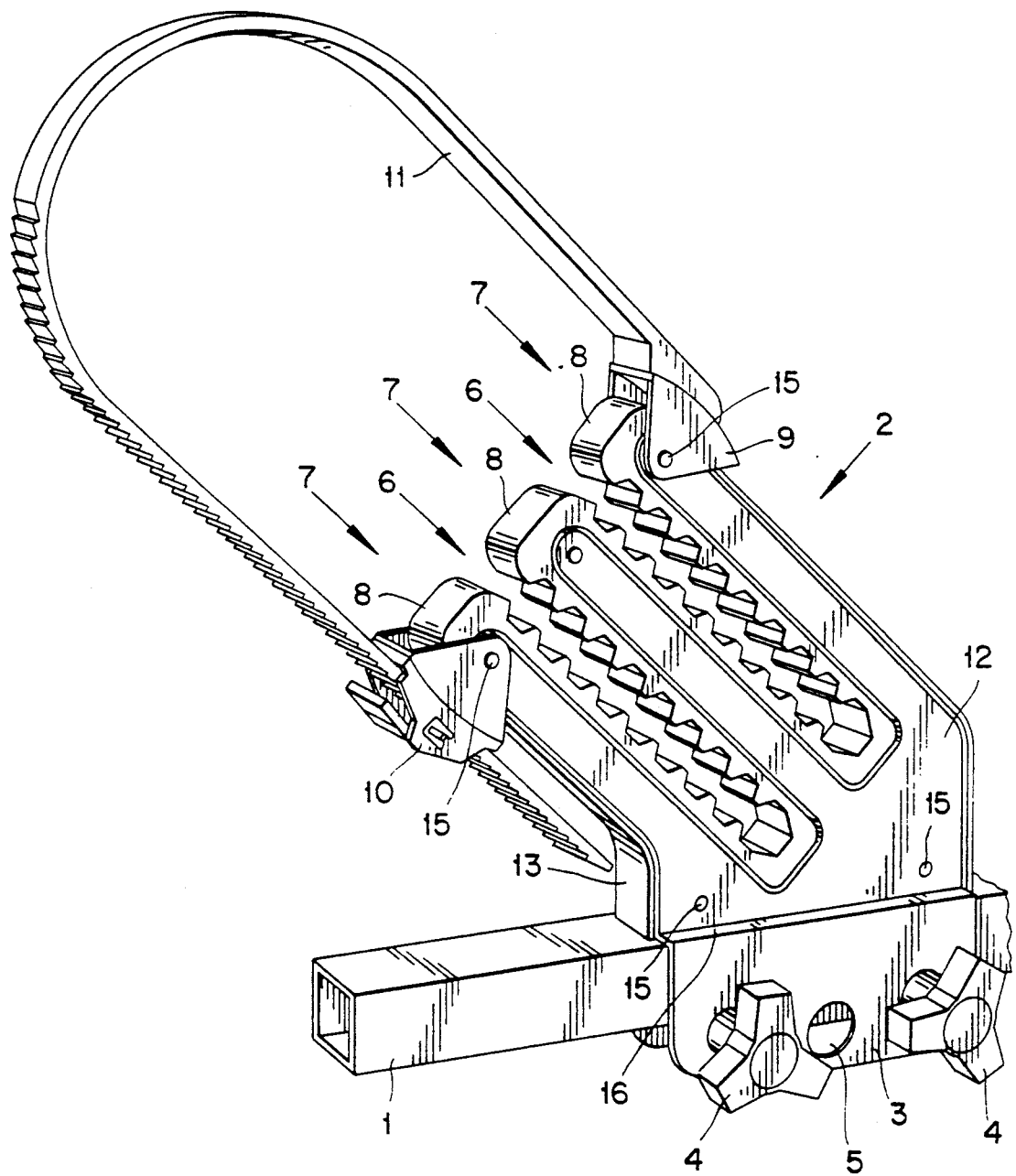
FIG. 1 is a perspective view of a first embodiment of the present invention.

Referring to the Drawings, in FIG. 1, reference numeral 1 relates to a strut which, by the intermediary of suitable foot arrangements, is secured transversely of the longitudinal direction of a vehicle, over the vehicle roof. In such instance, the foot arrangements secure the strut to side edge portions of the vehicle roof in a per se known manner. The apparatus according to the invention further includes a holder device 2 which is secured in adjustable position along the strut and which, at its lower end, is provided with anchorage portions 3 which straddle the strut 1 and are securable on the strut 1 by the intermediary of screws extending through the anchorage portions 3 and cooperating with nuts or cross heads 4. In this instance, the screws on which the nuts or cross heads 4 are disposed naturally extend more or less closely adjacent the underside of the strut.

The lower anchorage portions 3 of the holder device 2 are further provided with a through hole 5 which is intended for the passage beneath the strut of a so-called cable shackle by means of which a load carried by the holder device 2 may be rendered theft-proof.

The holder device 2 is further designed in such a manner as to be provided with at least one but preferably two accommodation spaces 6 in which the elongate objects, preferably so-called snow-boards or monoskis, are insertable obliquely from above. Thus, in the mounted state, the transverse direction of the objects will make an angle with a vertical line. Furthermore, the objects will be placed such that parts projecting from the objects such as bindings will be turned in the opposite direction. The accommodation spaces are further placed so that their upper, obliquely laterally directed openings are located facing outwardly towards the vehicle side.

The holder device 2 is further provided with at least two, but preferably three elongate fingers 7 which are approximately parallel to one another and which define the above-mentioned accommodation spaces 6. At least the fingers 7 are provided with gripping members 8 whose purpose is to abut against the transported objects.

In the embodiment comprising two fingers, the accommodation space 6 is wider than is apparent from FIG. 1, this accommodation space being intended for two objects lying against one another. In the embodiment according to FIG. 1, each accommodation space 6 is intended for only one object.

It will further be apparent from the Figure that the holder device 2 is provided with means for fixedly retaining the transported objects in the accommodation spaces 6, by preventing the objects from moving in the longitudinal direction of the fingers 7. These means consist of two fasteners 9 and 10, respectively, secured in the outer fingers, and of which the fastener 9 serves for permanent anchorage of a strap 11, while the fastener 10 is designed with a catch for permitting removable and adjustable securement of the opposing end of the strap. When the apparatus according to the present invention is reduced into practice, the strap 11 will, thus, extend about the edge portions of those transported objects which are not accommodated in the accommodation spaces 6.

Figure 2:
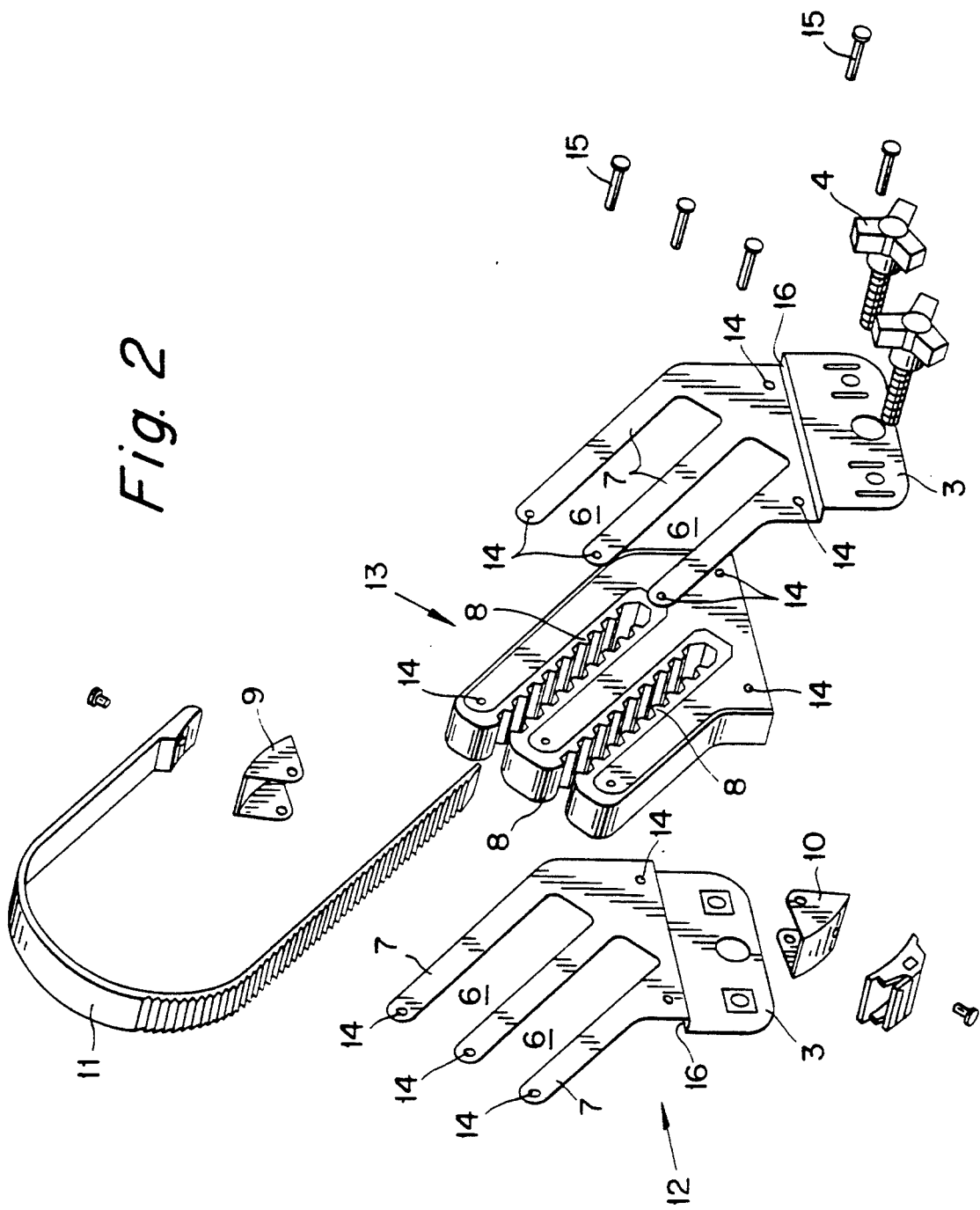
FIG. 2 is an exploded view of the embodiment of FIG. 1.

FIG. 2 illustrates in detail the design and construction of apparatus according to the invention. It will be apparent from this Figure that the holder device 2 is provided with two spaced-apart outer portions 12 with the fingers 7. The outer portions 12 are produced from panel-shaped, substantially rigid material, ideally sheet metal.

In the mounted state of the apparatus according to the present invention, an intermediate section 13 is located between the outer portions 12 and is produced from an at least partly resiliently yieldable material and which, in the illustrated embodiment, is of one-piece construction. The intermediate section 13 is designed so as simultaneously to constitute the gripping members 8 which, as is apparent from the Drawing, may be grooved or also provided with protruding pins or projections.

In the illustrated embodiment, both the outer portions 12 and the intermediate section 13 are provided with apertures 14 through which connection devices 15 in the form of screws or rivets are intended to extend in the mounted state of the apparatus according to the invention.

While it is not apparent from FIG. 2, there may suitably be disposed, in the apertures 14, spacers of rigid material through which the connection devices 15 extend so that, after locking thereof, both of the outer portions will constitute a rigid unit substantially without the cooperation of the intermediate section 13.

It will be apparent from both FIG. 1 and FIG. 2 that the outer portions 12 are provided, beneath the fingers 7, with outwardly angled shoulders 16 so that, thereby, the distance between the anchorage portions 3 of the outer portions will be greater than the inner distance between the fingers 7. These shoulders 16 will, in the mounted state of the apparatus according to the invention on the strut 1, rest on the strut and thereby prevent the holder device 2 from tilting by being twisted or rotated about an axis which is approximately parallel to any of the rivets 15. As a result of this design, material savings will also be made in the intermediate section 13, since this will then be thinner.

DESCRIPTION OF ALTERNATIVE EMBODIMENTS

Figure 3:
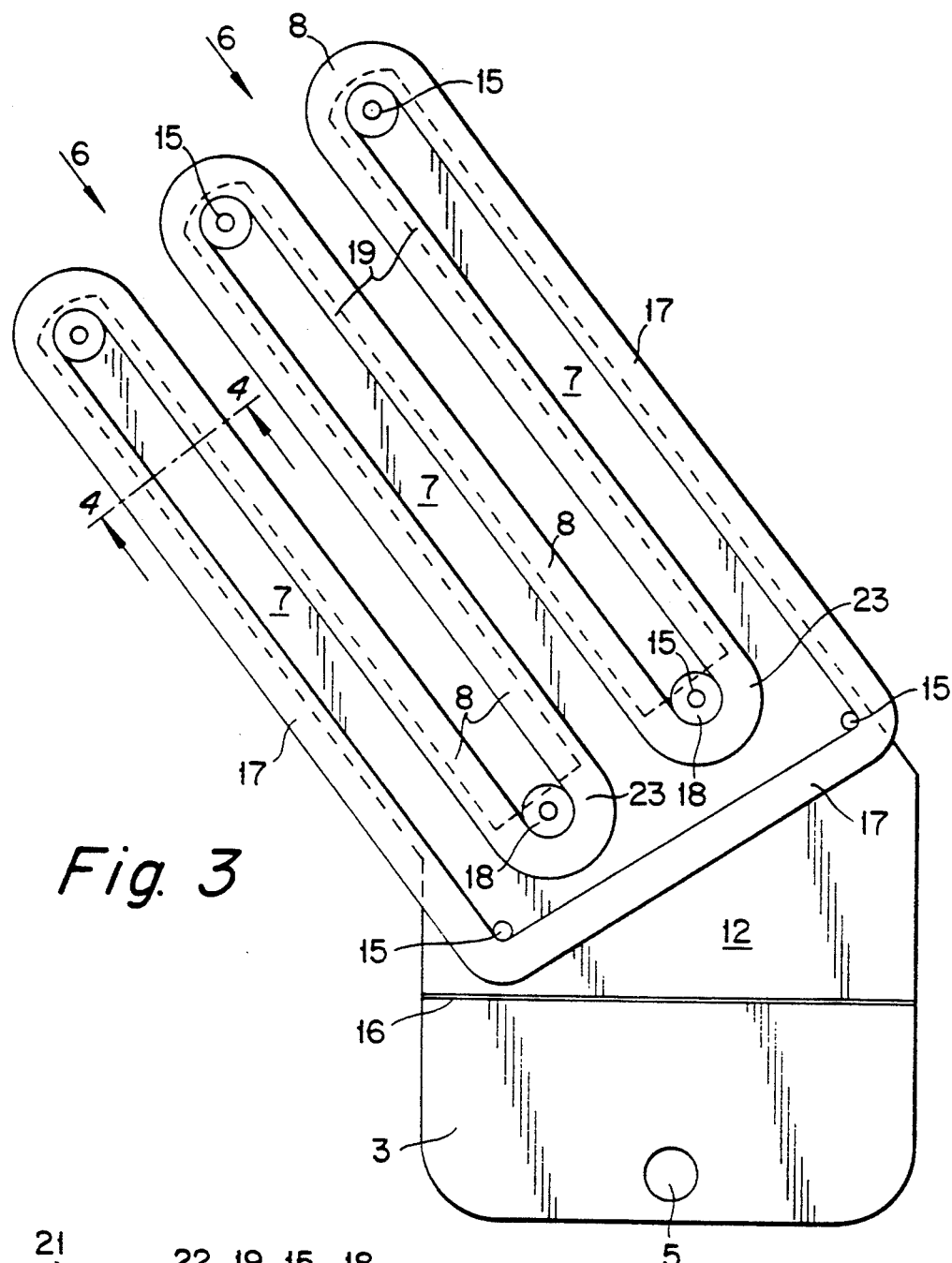
FIG. 3 is a partial section through one variation of the embodiment according to FIGS. 1 and 2.

FIG. 3 shows a partial view of a modified embodiment of the present invention, the outer portion 12 facing the observer having been removed for purposes of clarity.

In the embodiment according to FIG. 3, the gripping members 8 and/or the intermediate section 13 are of a different design and construction as compared with the embodiment according to FIGS. 1 and 2. Use is also made in the embodiment according to FIG. 3 of two spaced-apart outer portions 12 consisting of panel-shaped substantially rigid material and forming at least two, but preferably three fingers 7 extending approximately in parallel. Also in this embodiment, the outer portions 12 are mutually interconnected by the intermediary of connection devices 15 which, also in this embodiment, may consist of rivets.

As opposed to the disclosure with reference to the above-described embodiment, the gripping members 8 are designed as one elongate belt 17 which, with at least one part 19, is located in between the outer portions 12 and, in particular, their fingers 7. In the illustrated embodiment, the belt extends as an endless loop and is tensioned over the connection devices 15. The belt 17 is arranged in such a manner as to follow the edges of the fingers 7 and has portions 20 which lie outside the cross section of the fingers, these portions being intended to come into contact with the transported object.

The connection devices 15 are, at the bottom of the accommodation spaces 6, provided with bushings 18 of yieldable material, or with arrest means of other design, which are intended partly to retain the gripping members 8 in the correct position and partly to be capable of abutting against an edge portion of a transported object located in the accommodation space 6. As shown in FIG. 3, similar bushings may possibly be employed at the outer ends of the fingers, even though this is not necessary.

If the belt 17 is tightened sufficiently, the gripping members 8 will hereby possess enough resistance against being forced in wholly between the fingers 7 on the outer portions 12 so that thereby the transported object is prevented from coming into direct contact with the edges of the fingers. In order to strengthen the resistance against such inward forcing of the gripping members in the region in between the fingers, additional connection devices (not shown on the Drawing) may, however, be employed, these being preferably placed at the inner regions of the fingers 7, one on either side of an accommodation space 6.

While it is not apparent from the Drawing, the belt 17 is suitably produced as a long, continuous web which is joined in a suitable manner so as to achieve the closed loop form. In production, the belt may hereby readily be given ridges or grooves extending in the longitudinal direction, or projecting strips which correspond to the grooving on the gripping members 8 in the embodiment according to FIGS. 1 and 2. Apart from the possible grooving on the sides of the belt facing towards the accommodation spaces 6, the belt may, in the embodiment according to FIG. 3, be of substantially rectangular cross section.

Figure 4:
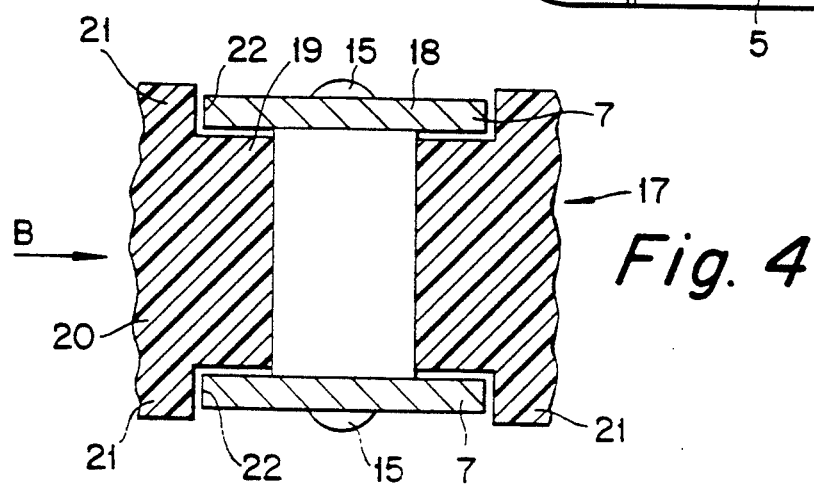
FIG. 4 is a section taken along the section line A—A in FIG. 3 of a further modified embodiment of the invention.

In order to prevent the belt 17 from being forced in between the fingers 7 of the outer portions 12, the belt may have that cross sectional configuration which is shown in FIG. 4. It will be apparent from this Figure that both fingers 7 of the outer portions are in spaced-apart relationship from one another and that a sleeve 18 is disposed therebetween, as well as a rivet 15 serving as connection device. The belt 17 has an inner part 19 which, at the outer ends of the fingers 7, lies about the sleeve or bushing 18 or, in the absence thereof, directly against the connection device 15. Along the remaining longitudinal section of the fingers 7, the inner part 19 of the belt 17 is also located in between the fingers, but is here unsupported in the transverse direction of the fingers. The belt 17 further has an outer part 20 which is of greater width than the inner distance between the fingers and which may preferably be of the same width as or slightly wider than the outer width over the fingers. Hereby, the belt 17 will have laterally projecting portions 21 which may come into abutment against the edge surfaces 22 of the fingers 7 if the belt were to be exposed to a force according to the arrow B, i.e. transversely of the longitudinal direction of the fingers 7.

In order to make room for the laterally projecting portions 21 of the belt 17 also between the major portions proper of the outer portions 12, i.e. in the region 23 at the bottom of the accommodation spaces 6, the outer portions 12 may, in this region, be provided with suitable, outwardly directed punched regions so that thereby the bushings or sleeves 18 and the connection devices 15 will, at these regions, be longer than is the case at the outer ends of the fingers 7.

In order to make room for the laterally projecting portions 21 on that part of the belt which is located in between the outer portions 12 immediately above the shoulders 16, both of the connection devices 15 which stretch the belt along this part may be placed closer to the shoulders so that, thereby, the projecting portions 21 will be located beneath the shoulders.

As an alternative to the above-outlined placement of the connection devices 15, the outer portions 12 may, of course, also be provided with corresponding grooves for accommodating the edge portions 21 of the belt.

As an alternative to making the belt 17 in the form of a closed loop, the belt may, of course, also be secured in its outer regions in the area between the bottom of the accommodation spaces 6 and the shoulders 16.

According to a third embodiment of the present invention, the anchorage portion of the holder device 2 may be of one-piece construction, for example by injection moulding of a relatively rigid plastic material. In this embodiment, the fingers 7 are included as integral parts in the holder device. Furthermore, this integral part is preferably provided with downwardly directed anchorage portions of one-piece manufacture which correspond to the anchorage portions 3 of the outer portions 12.

In the last-described embodiment, the gripping members 8 are applied at least on the mutually facing surfaces of the fingers and may be fixed in place by gluing, or be injection moulded in a soft, resiliently yieldable material directly against the rigid fingers. In all embodiments, the gripping members 8 may, of course, also be designed as sleeves which are drawn over the fingers and surround them.

The present invention may be further modified without departing from the spirit and scope of the appended claims.

I claim:

1. An apparatus for pairwise transport of elongate, panel-shaped objects, the apparatus comprising:
 a strut extending transversely across a vehicle roof and secured in side portions of the vehicle roof;
 a holder device on the strut, the holder device defining at least one accommodation space in which the objects are held such that, a longitudinal dimension of the objects is in a direction of travel of the vehicle and a lateral dimension of the objects is inclined in relation to a vertical line, the holder device including
  an anchorage arrangement including at least two spaced-apart outer portions formed from panel-shaped material, the outer portions being connected to one another by connection devices, the outer portions each including at least two substantially parallel fingers defining one or more accommodation space, and
  one or more gripping members formed of yieldable material, the gripping members extending outside facing surfaces of the fingers, the gripping members being arranged between the outer portions and being provided with fingers having a greater width than the fingers of the outer portions.

2. The apparatus as claimed in claim 1, wherein the fingers of the gripping members extend outside a contour of the fingers of the outer portions at free ends of the fingers of the outer portions and at bottoms of the accommodation space between adjacent fingers of the outer portions.

3. The apparatus as claimed in claim 1, wherein the gripping members are provided with projections for abutment with the objects.

4. Apparatus as claimed in claim 1, wherein the outer portions include anchorage portions which straddle the strut and are secured thereon.

5. The apparatus as claimed in claim 4, wherein the anchorage portions extend past the strut and an aperture is formed in an extended portion of the anchorage portions for passage of a cable shackle.

6. The apparatus as claimed in claim 1, wherein the gripping members are in the form of a continuous member corresponding in shape to at least a portion of the anchorage arrangement.

7. The apparatus as claimed in claim 1, wherein the gripping members are in the form of a belt which extends about the connection devices and is held relative to the connection devices such that the gripping members follow a contour of the fingers of the outer portions.

8. The apparatus as claimed in claim 7, wherein the belt includes parts of greater width than an inner distance between the outer portions, the belt having edge portions disposed adjacent to at least portions of edges of the outer portions, at least along the fingers of the outer portions.

9. The apparatus as claimed in claim 1, wherein the holder device further includes means for engaging the objects, the engaging means preventing displacement of the objects in a longitudinal direction of the fingers of the outer portions.

10. The apparatus as claimed in claim 1, wherein the outer portions include three substantially parallel fingers defining two accomodation spaces.

* * * * *